(12) United States Patent  
Brunner

(10) Patent No.: US 6,193,093 B1  
(45) Date of Patent: Feb. 27, 2001

(54) FUEL TANK CAP

(76) Inventor: Heinz Brunner, Steinkreuzweg 2, D-91639 Wolframs-Eschenbach (DE)

(*) Notice: Subject to any disclaimer, the term of this patent is extended or adjusted under 35 U.S.C. 154(b) by 0 days.

(21) Appl. No.: 09/414,009

(22) Filed: Oct. 7, 1999

(30) Foreign Application Priority Data

Oct. 9, 1998 (DE) .............................................. 198 46 498

(51) Int. Cl.$^7$ ................................................. B65D 55/12
(52) U.S. Cl. .......................... 220/234; 220/238; 220/86.2
(58) Field of Search .................................... 220/233, 234, 220/238, 849, 830, 827, DIG. 33, 86.2; 215/359, 361

(56) References Cited

U.S. PATENT DOCUMENTS

| | | | |
|---|---|---|---|
| 2,740,548 | * | 4/1956 | Schultz et al. |
| 3,087,641 | * | 4/1963 | Millard. |
| 4,567,994 | * | 2/1986 | Hofmann .............................. 220/234 |
| 5,056,678 | * | 10/1991 | Grills et al. ........................... 220/238 |
| 5,845,800 | * | 12/1998 | Shaw et al. ........................... 220/210 |
| 6,102,234 | * | 8/2000 | Kremer er al. ....................... 220/86.2 |

* cited by examiner

Primary Examiner—Stephen Castellano  
(74) Attorney, Agent, or Firm—Jordan and Hamburg LLP

(57) ABSTRACT

A fuel tank cap at the filler neck of a motor vehicle fuel tank, with a locking gas cap, which can be swiveled about a pivoting axis and a locking part, which is disposed internally at the locking gas cap and lies against the edge of the filler neck, sealing it, in the closed position, in which it can be locked and in which the locking gas cap is spring-loaded in the opening direction, it being possible to unlock the locking gas cap and swivel it into the open position by pressing down on it briefly especially by means of a robot-guided fuel pump nozzle, the opening of the tank connection pipe, which is to be closed off, being disposed offset towards the inside at the inner end of an essentially cylindrical expansion of the tank connection pipe and that, internally, at the locking gas cap, a casing being fastened, in which a piston, which is provided with a seal that is seated on the opening that is to be closed off, is mounted axially displaceable and which, when acted upon axially by pressure, forces a blocking element radially towards the outside into a locking edge groove of the cylindrical expansion of the tank connection pipe, the piston being mounted in the casing in the form of a pushbutton switch, which locks when depressed and releases once again when depressed once more, so that the casing with the locking gas cap moves to the outside relative to the piston and the blocking element is retracted from the locking groove.

11 Claims, 2 Drawing Sheets

FUEL TANK CAP

BACKGROUND OF THE INVENTION

The invention relates to a fuel tank cap at the filler neck of a motor vehicle fuel tank, with a locking gas cap, which can be swiveled about a pivoting axis and a locking part, which is disposed internally at the locking gas cap and lies against the edge of the filler neck, sealing it, in the closed position, in which it can be locked and in which the locking gas cap is spring-loaded in the opening direction, it being possible to unlock the locking gas cap and swivel it into the open position by pressing down on it briefly especially by means of a robot-guided fuel pump nozzle.

For conventional fuel tank cap systems, a filler neck, starting out from a fuel tank, is manually closed off tightly by means of a screw-in locking gas cap. The locking gas cap, in turn, is covered by a fuel tank flap, which is embedded in the side wall of the vehicle. However, such fuel tank cap systems are obviously not suitable for the automatic refueling of motor vehicles which is planned for the future.

A series of differently configured fuel tank cap systems has already been proposed in order to make automatic refueling possible. For example, the Offenlegungsschrift DE 42 43 883 A1, which is incorporated herein by reference, already discloses a locking construction of the type described above. The unlocking takes place due to the fact that an unlocking pipe, which can be connected with the refueling pipe, comes up against a lever arm of the locking gas cap, opening the latter. This means, that in every case, aside from a fuel pump nozzle, a separate unlocking pipe must be provided, since the lid remains open only as long as the unlocking pipe is pressed onto the lever at the locking gas cap. In turn, such design requires that special refueling equipment is required and that it is not possible to use different automated fueling systems in conjunction with such a motor vehicle closing device.

However, since it is absolutely essential to construct the fuel tank cap in such a manner that different automatic refueling systems can also be used in conjunction with such a fuel tank cap, insofar as it cannot be expected that the oil industry will introduce a uniform refueling system, it is therefore an object of the present invention to configure a closing device at the filler neck of a motor vehicle fuel tank of the type referred to above, in such a manner that it can be unlocked from the outside merely by briefly pushing against it and, in the same way, closed and locked once again so as to form a seal simply by pressing it shut.

SUMMARY OF THE INVENTION

To accomplish this objective, provisions are made pursuant to the invention so that the opening of the tank connection pipe, which is to be closed off, is disposed offset towards the inside at the inner end of an essentially cylindrical expansion of the tank connection pipe and that, internally, at the locking gas cap, a casing is fastened, in which a piston, which is provided with a seal that is seated on the opening that is to be closed off, is mounted axially displaceable and which, when acted upon axially by pressure, forces a blocking element radially towards the outside into a locking edge groove of the cylindrical expansion of the tank connection pipe. The piston is mounted in the casing in the form of a pushbutton switch, which locks when depressed and releases once again when depressed once more, so that the casing with the locking gas cap moves to the outside relative to the piston and the blocking element is retracted from the locking groove.

Due to the inventive configuration, the inventive fuel tank cap, starting out from an open position, can be closed simply by pressing shut the locking fuel cap, which is hinged to the car body, together with the internally mounted locking part. By once again pressing the fuel tank cap, so closed, slightly further, the locking is released automatically and, preferably by providing a spring element, the lid is caused to spring open completely for the purpose of introducing the tank connection pipe. Such a locking and unlocking system can evidently be used for automatic refueling, the tank connection pipe or a scanning element, rigidly disposed at the nozzle, initially coming up against the locking gas cap and, by these means, opening it. After the refueling, the locking gas cap is pressed on simply once again in an appropriate manner and, at the same time, locked tightly.

In the simplest case, the blocking element can be a stop sphere. However, in a further development of the invention, it has proven to be particularly advantageous if the blocking element is a rubber elastic ring, which is mounted on the piston and is supported between the head of the piston, carrying the seal for the tank connection pipe, and the casing and which, when acted upon axially by pressure, after the piston is placed on the opening of the tank connection pipe, which is to be closed off, is expanded radially and pressed into the edge locking groove. The rubber elastic ring, by means of which the locking is achieved, and/or a spirally coiled spring between the fuel tank cap and the piston ensure a bracing in the opening direction, so that, after the blocking element is unlocked, the locking gas cap is forced towards the outside relative to the piston which, to begin with, is still seated on the opening that is to be closed off, and this opening motion then causes the whole of the closing system to spring open.

The piston can be mounted in the casing in the form of a clamping displacement mechanism of a ball point pen.

In accordance with a further embodiment of the invention, instead of such a clamping displacement mechanism of a ball point pen, provisions are made so that a heart-shaped curve is disposed and, in particular, molded into the piston, and is engaged by one end of a latching hook, the other end of which is mounted at the casing. While closing by pressing on the tension spring, especially of the rubber elastic ring that serves for the locking, the latching hook passes through one of the curved branches of the heart-shaped curve into the upper arc end from where, when there is a slight spring-back, it reaches a central locking position. Conversely, by briefly pressing on the fuel tank cap of the locked closing device, the hook is moved upward back into the edge region and slides along the corresponding curve line into its lower middle position, so that the casing and the piston can be shifted axially against one another by a distance, which corresponds to the distance between the two center positions of the heart-shaped curve. This is sufficient for relieving the tension on the rubber elastic ring, so that is retracts from the locking edge groove and opening of the fuel tank cap thus can take place.

The above, and other objects, distinguishing features, details and advantages of the present invention will become apparent from the following description read in conjunction with the accompanying drawings, in which like reference numerals designate the same elements.

DETAILED DESCRIPTION OF THE PREFERRED EMBODIMENT

Figure 1:
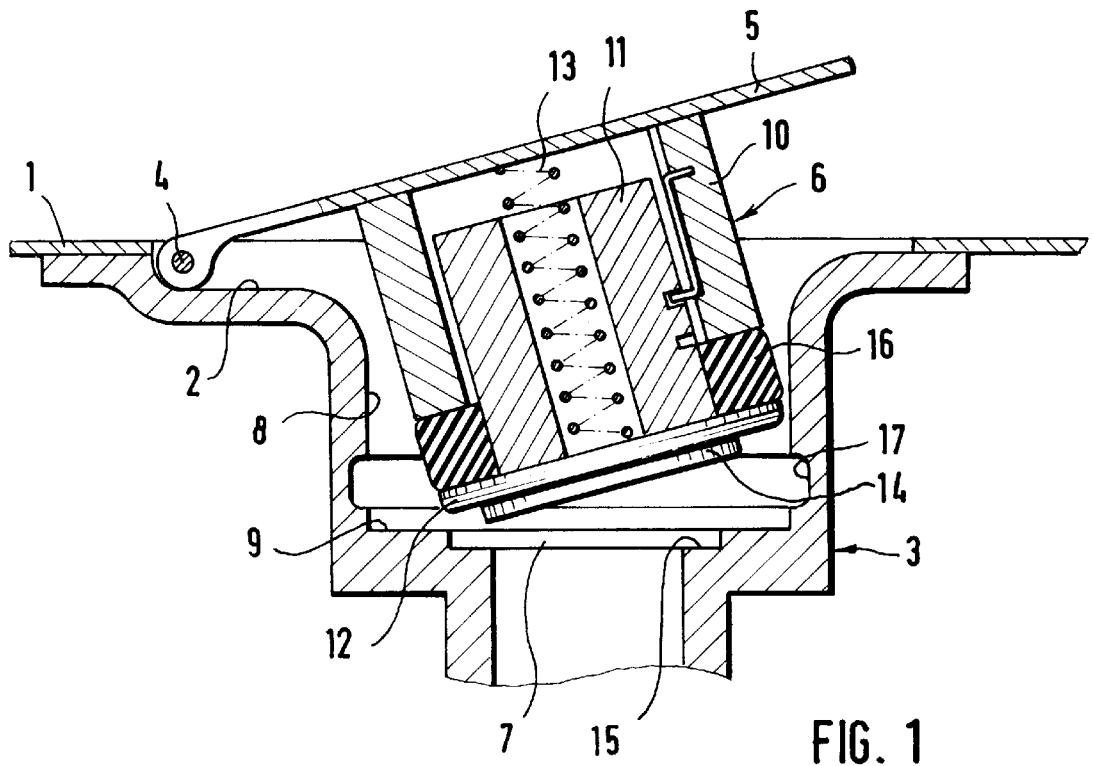
FIG. 1 is a section through a fuel tank cap according to an embodiment of the invention shown in a partially open position.

The inventive fuel tank cap comprises a locking gas cap 5, which is hinged either at the car body 1 or, as shown in the Figures, at an external expansion 2 of the tank connection pipe 3 with the help of a joint 4 and at the interior of which a closing part 6 is fastened which, by simply pressing the locking gas cap 5 shut, closes off the internally offset opening 7 of the tank connection pipe 3. By pressing the locking gas cap 5 shut, this closed position is also locked. In the same way, simply by pressing briefly on the locking gas cap 5, which is in the closed position shown in FIG. 2, unlocking takes place, so that the locking gas cap 5 simply springs open once again towards the outside.

Figure 2:
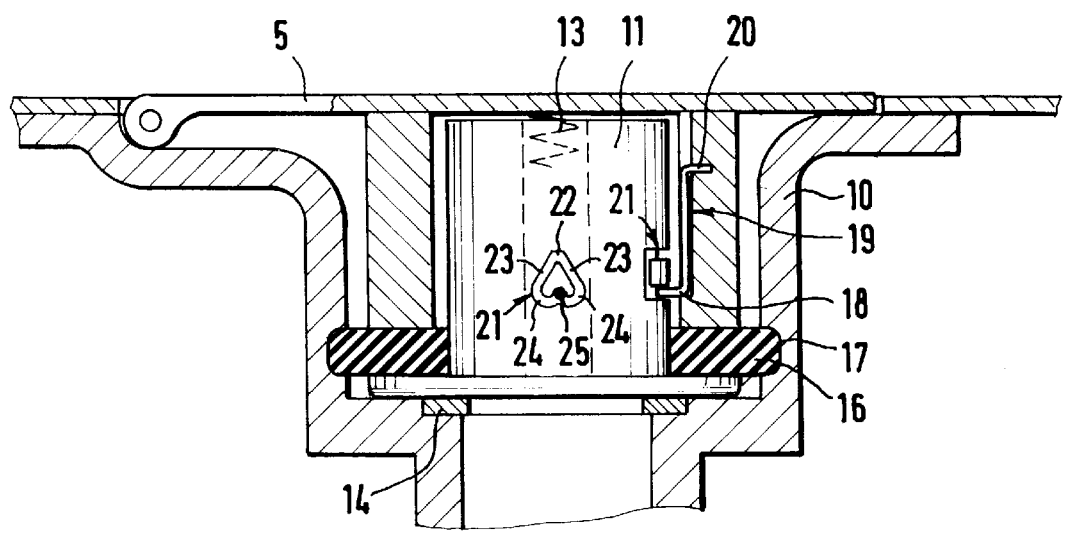
FIG. 2 is a section through the fuel tank cap of FIG. 1 shown in a closed position, the heart-shaped curve, which is disposed laterally at the piston, being additionally drawn in the center for greater clarity.
Figure 3:
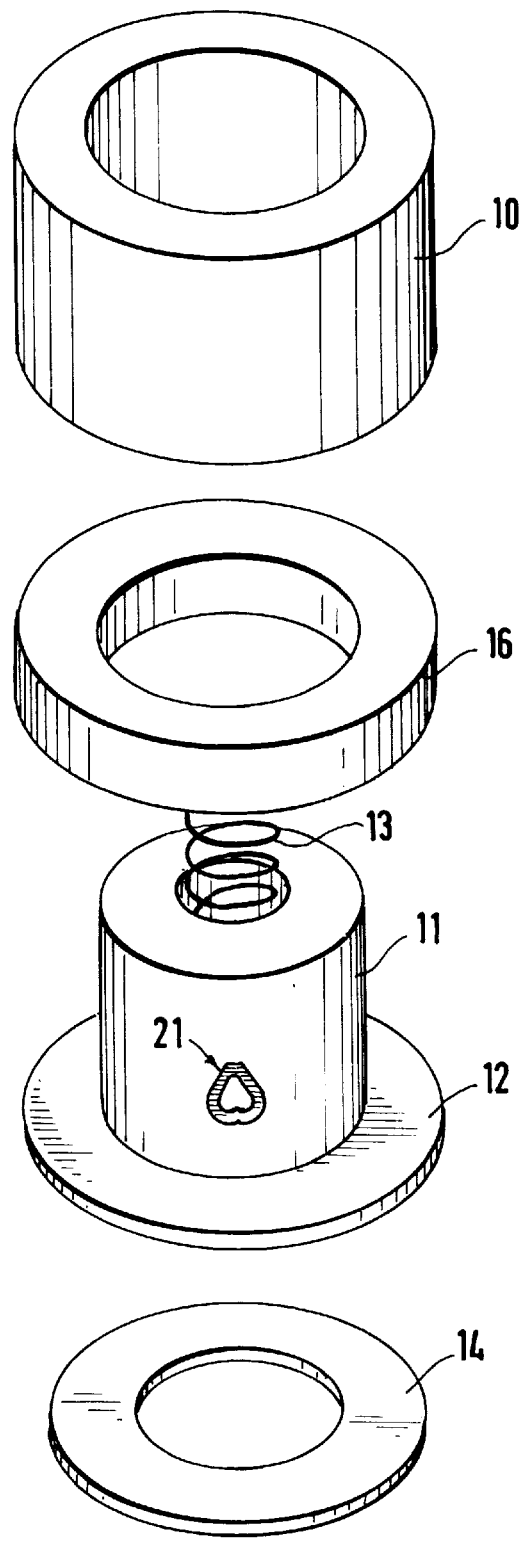
FIG. 3 is an exploded view representative of the individual parts of the closing part of the locking gas cap of FIGS. 1 and 2.

In addition to the expansion 2, which is not absolutely essential in practice and would be dispensable if the locking gas cap 5 were hinged directly at the car body 1, the tank connection pipe 3 is provided with a cylindrical expansion 8, which is located at the outer end and in the bottom 9 of which, the opening 7, which is actually to be closed, is located. A piston 11 with a head part 12 is mounted axially displaceable in a casing 10, which is fastened rigidly to the locking gas cap 5. A spring 13 puts the piston under tension with respect to the locking gas cap. On the head part 12 of the piston 11, a gasket or also a simple ring seal 14 is placed which, during the closing of the locking gas cap 5, is seated on an edge shoulder 15 of the tank connection pipe 3 surrounding the opening 7 that is to be closed. Between the head part 12 of the piston 11 and the casing 10, a rubber elastic ring 16 is disposed, which is supported on the piston 11 and, when the locking gas cap is closed, is placed under tension between the head part 12 and the casing 10, so that it is pushed to the outside and engages a locking edge groove 17 of the cylindrical expansion 8 of the tank connection pipe 3, locking it (see FIG. 2). During this closing motion, the end 18 of a latching hook 19, which is mounted with its other end 20 at the casing 10, is shifted into a heart-shaped curve 21, as shown in FIG. 3 and, merely for the sake of greater clarity, also once again additionally is shown in FIG. 2 in the center of the piston. Starting out from the lower reversal point 22, the hook-shaped end 18 runs along one of the paths 23 of the heart-shaped curve 21 up to one of the arcs 24. If then the pressure on the locking gas cap 5 is released, the latter moves, due to the force of the spirally coiled spring 13 and also additionally due to the force of the compressed rubber elastic ring 16, a small distance towards the outside and, at the same time, latches under the central latching curvature 25 of the heart-shaped curve. In this position, displacement of the piston relative to the casing and locking gas cap is blocked, and the locking gas cap, together with the closing part 6, is locked as shown in FIG. 2. At the same time, the seal 14 is pressed tightly onto the shoulder 15 around the opening 7 of the tank connection pipe 3 that is to be closed off.

In order to open the locking gas cap, the latter is pushed a few millimeters inward against the force of the spring 13 and of the compressed rubber elastic ring 16, as a result of which the latching hook leaves its locking position and can run back along one of the curves 23 of the heart-shaped curves into the outer latching position 22. This permits a correspondingly long axial displacement of the piston 11 relative to the casing 10, so that the rubber elastic ring can expand axially once again and, at the same time, retract radially from the locking edge groove 17. The lid springs open into the open position due to the force of the spring 13 and of the rubber elastic ring 16.

The invention is not limited to the examples shown. Aside from the possibility already addressed of mounting the cap at the car body and not directly at the outer flange of the tank connection pipe, the pushbutton locking device could also be constructed in a manner other than with the heart-shaped curve and latching hook shown, for example, in the manner of a clamping displacement mechanism of a ball point pen.

Having described preferred embodiments of the invention with reference to the accompanying drawings, it is to be understood that the invention is not limited to those precise embodiments, for example as noted above, and that various changes and modifications may be effected therein by one skilled in the art without departing from the scope or spirit of the invention as defined in the appended claims.

What is claimed is:

1. A fuel tank cap at the filler neck of a motor vehicle fuel tank, with a locking gas cap, which can be swiveled about a pivoting axis and a locking part, which is disposed internally at the locking gas cap and lies against the edge of the filler neck, sealing it, in the closed position, in which it can be locked and in which the locking gas cap is spring-loaded in the opening direction, it being possible to unlock the locking gas cap and swivel it into the open position by pressing down on it briefly especially by means of a robot-guided fuel pump nozzle, the opening of the tank connection pipe, which is to be closed off, is disposed offset towards the inside at the inner end of an essentially cylindrical expansion of the tank connection pipe and that, internally, at the locking gas cap, a casing is fastened, in which a piston, which is provided with a seal that is seated on the opening that is to be closed off, is mounted axially displaceable and which, when acted upon axially by pressure, forces a blocking element radially towards the outside into a locking edge groove of the cylindrical expansion of the tank connection pipe, the piston being mounted in the casing in the form of a pushbutton switch, which locks when depressed and releases once again when depressed once more, so that the casing with the locking gas cap moves to the outside relative to the piston and the blocking element is retracted from the locking groove.

2. The fuel tank cap of claim 1, wherein the blocking element is a stop sphere.

3. The fuel tank cap of claim 1, wherein the blocking element is a rubber elastic ring, which is mounted on the piston and is supported between the head of the piston, carrying the seal for the tank connection pipe, and the casing and which, when acted upon axially by pressure, after the piston is placed on the edge of the opening, is expanded radially and pressed into the edge locking groove.

4. The fuel tank cap of claim 1, wherein the mounting of the piston in the casing is constructed in the form of a clamping displacement mechanism of a ball point pen.

5. The fuel tank cap of claim 1, wherein a heart-shaped curve is disposed at the piston and engaged by one end of a latching hook, which is mounted with its other end at the casing.

6. A fuel tank cap for closing a filler neck of a fuel tank of a motor vehicle, comprising:
    a tank connection pipe leading from the fuel tank to an opening to an exterior of the motor vehicle, said tank connection pipe having an expanded diameter at a portion thereof adjacent the opening to the exterior, thereby defining a cylindrical expansion, the tank connection pipe including an internally offset opening, located a distance from said opening, connecting the cylindrical expansion with a remainder of the tank connection pipe leading to the fuel tank which comprises the filler neck, a region surrounding the internally offset opening of the filler neck defining a shoulder, said cylindrical expansion including a locking edge groove formed therein in an axial position within said cylindrical expansion located between said opening and said internally offset opening;

a locking gas cap hingably mounted to a fixed structure of the motor vehicle for movement of said locking gas cap between an open position in which it is as least partially free of said opening and a closed position in which it overlays the opening of the tank connection pipe to the exterior;

a closing part including a casing carried on the locking gas cap, disposed on a side thereof facing inwardly of the cylindrical expansion when said locking gas cap is in said closed position;

said closing part further including a piston received within said casing and axially displaceable therein, said piston being biased in a direction away from said locking gas cap, said piston including a seal which is brought into seated engagement with the shoulder of the tank connection pipe and sealing the filler neck of said tank connection pipe when said locking gas cap is moved to said closed position;

said closing part further including a blocking element, said blocking element being forced radially outward into the locking edge groove of the cylindrical expansion of the tank connection pipe in response to pressure applied axially to said piston when said locking gas cap is moved to said closed position; and the piston being mounted in the casing in such a manner that it operates as an alternating pushbutton switch which locks the locking gas cap in the closed position when depressed from the open position and releases the locking gas cap to the open position once again when depressed once more, the casing, along with the locking gas cap, being moved outwardly of the motor vehicle relative to the piston by operation of the biasing of the piston, and the blocking element being retracted from the locking edge groove.

7. A fuel tank cap according to claim 6, wherein said locking gas cap is spring biased in the open position.

8. A fuel tank cap according to claim 6, wherein said fixed structure of the motor vehicle is one of car body and an external expansion of the tank connection pipe.

9. A fuel tank cap according to claim 6, wherein:

the piston includes a head on which the seal is disposed; and the blocking element includes a rubber elastic ring which is mounted on the piston and supported between the head of the piston and the casing, said rubber elastic ring being expanded radially to at least partially protrude into the edge locking groove when the piston is acted upon axially by pressure applied after the piston is placed on the shoulder surrounding the internally offset opening of the filler neck.

10. A fuel tank cap according to claim 6, wherein:

the piston includes a head on which the seal is disposed; and the blocking element includes a spirally coiled spring of annular configuration which is mounted on the piston and supported between the head of the piston and the casing, said spirally coiled spring being expanded radially to at least partially protrude into the edge locking groove when the piston is acted upon axially by pressure applied after the piston is placed on the shoulder surrounding the internally offset opening of the filler neck.

11. A fuel tank cap according to claim 6, wherein:

a latching hook, an end of which is mounted to the casing; and the piston includes a heart-shaped curve disposed laterally in a side of the piston, the heart-shaped curve being engaged by another end of the latching hook.

* * * * *